United States Patent [19]

Nakamura et al.

[11] Patent Number: 4,637,487
[45] Date of Patent: Jan. 20, 1987

[54] TRACTION CONTROL DEVICE OF A MOTOR VEHICLE

[75] Inventors: Kazumasa Nakamura, Okazaki; Ikuya Kobayashi; Takahiro Nogami, both of Toyota; Akira Shirai, Toyoake; Yoshihisa Nomura, Toyota; Kaoru Ohashi, Okazaki, all of Japan

[73] Assignee: Toyota Jidosha Kabushiki Kaisha, Toyota, Japan

[21] Appl. No.: 771,774

[22] Filed: Sep. 3, 1985

[30] Foreign Application Priority Data

Sep. 3, 1984 [JP] Japan ................... 59-184768

[51] Int. Cl.⁴ ............................................. B60K 27/00
[52] U.S. Cl. ...................................... 180/197; 123/336
[58] Field of Search ............... 180/197, 219, 170, 335; 123/336, 332, 333, 344

[56] References Cited

U.S. PATENT DOCUMENTS

| 3,861,490 | 1/1975 | Sakakibara | 123/336 |
| 4,484,551 | 11/1984 | Choma et al. | 123/336 |
| 4,545,455 | 10/1985 | Kanemura et al. | 180/197 |
| 4,554,990 | 11/1985 | Kamiya et al. | 180/197 |

FOREIGN PATENT DOCUMENTS

| 50-5764 | 3/1975 | Japan . |
| 50-36839 | 4/1975 | Japan . |
| 50-2449 | 2/1979 | Japan . |

Primary Examiner—John J. Love
Assistant Examiner—Donn McGiehan
Attorney, Agent, or Firm—Cushman, Darby & Cushman

[57] ABSTRACT

A traction control device in an engine which has an intake passage. A throttle valve and a flow control valve are arranged in series in the intake passage. Where acceleration of the motor vehicle is carried out, when the speed of rotation of the driven wheel or acceleration of the speed of rotation of the driven wheel exceeds a predetermined level, the flow control valve is closed. When the speed of rotation of the driven wheel becomes lower than a predetermined level or deceleration of the speed of rotation of the driven wheel becomes larger than a predetermined level, the flow control valve is opened.

20 Claims, 13 Drawing Figures

TRACTION CONTROL DEVICE OF A MOTOR VEHICLE

BACKGROUND OF THE INVENTION

1. Field of the Invention

The present invention relates to a traction control device of a motor vehicle.

2. Description of the Related Art

When the accelerator pedal of a vehicle is abruptly depressed in order to accelerate the engine in a motor vehicle, sometimes slippage occurs at the drive wheels and the tires do not grip the surface of the ground. Thus, slight traction is given to the vehicle. Namely, if slippage occurs at the driven wheels, the drive force for the vehicle body is reduced, and thus a problem occurs in that a correct acceleration of the vehicle cannot be obtained.

To prevent slippage at the driven wheels when the engine is abruptly accelerated, various methods have been proposed, for example, a method in which the output power of the engine is reduced by reducing the amount of fuel fed to the engine cylinders when slippage occurs at the driven wheels. In another method, the output power of the engine is reduced by retarding the ignition timing when slippage occurs at the driven wheels. However, in these methods, the engine operating state is abruptly changed and, as a result, a problem occurs in that engine vibration is generated or the engine is stalled.

A further method of controlling the throttle valve actuated by the accelerator pedal has been considered. In this method, when the throttle valve is fully open to accelerate the engine and slippage occurs at the driven wheels, the throttle valve is compulsorily rotated toward the closed position regardless of the operation of the accelerator pedal and, thereby, the output power of the engine is temporarily reduced. Subsequently, when the slippage of the driven wheels has stopped, the throttle valve is rotated toward the fully open position. However, in this method, the control device for controlling the throttle valve can become inoperative, through damage, etc. and, as a result, the throttle valve may be stuck at the fully open position, and the engine rotates at a full power output. Therefore, a problem occurs in that a safe driving condition is unobtainable. In addition, in the above method, since it is necessary to construct the throttle valve in such a manner that it is actuated by both the accelerator pedal and the control device, the construction of the throttle valve becomes complicated and, therefore, a problem occurs in that it is difficult to obtain a high durability of the throttle valve.

SUMMARY OF THE INVENTION

An object of the present invention is to provide a traction control device capable of ensuring safe driving and good acceleration and having a simple construction and good durability.

According to the present invention, there is provided a traction control device for a motor vehicle having a plurality of wheels including at least one driven wheel, the device comprising: an internal combustion engine having an intake passage and connected to and driving the driven wheel; a manually operated throttle valve arranged in the intake passage; detecting means for detecting the speed of rotation of the driven wheel of the motor vehicle; a flow control valve arranged in the intake passage in series with the throttle valve; drive means for driving the flow control valve; and electronic control means connected to the detecting means and the flow control valve driving means and controlling a flow area of the flow control valve in response to an output signal of the detecting means to bring the speed of rotation of the driven wheel close to a desired speed of rotation at which a frictional force between the driven wheel and the surface of the ground is maximized when the speed of rotation of the driven wheel deviates from the desired speed of rotation during an acceleration of the motor vehicle.

The present invention may be more fully understood from the description of preferred embodiments of the invention set forth below, together with the accompanying drawings.

DESCRIPTION OF THE PREFERRED EMBODIMENTS

Figure 1:
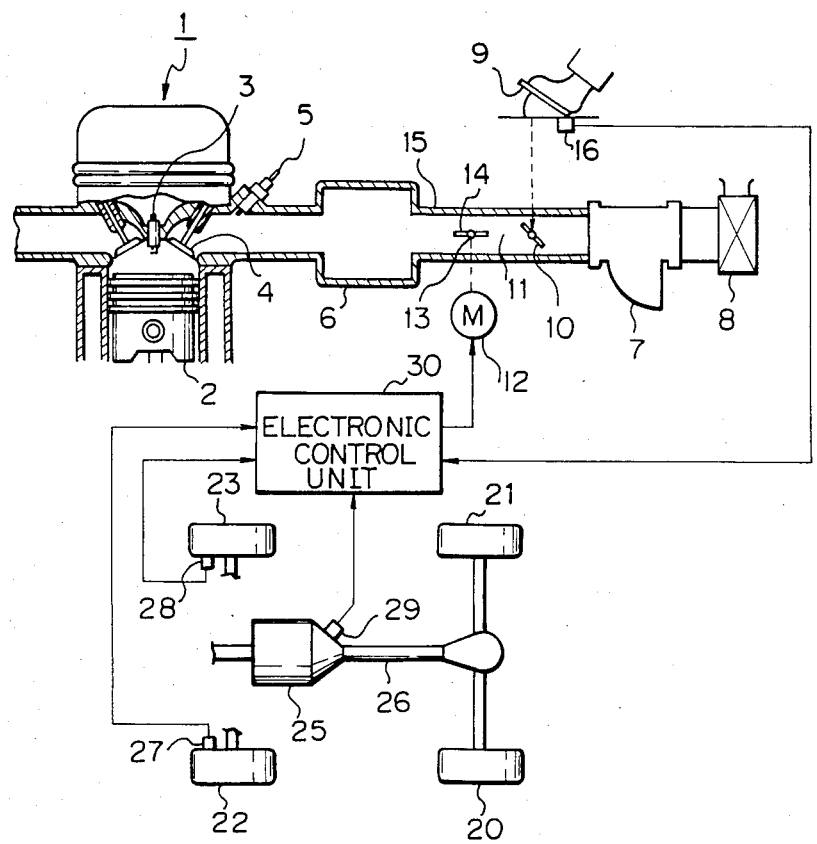
FIG. 1 is a schematic view of a motor vehicle.
Figure 2:
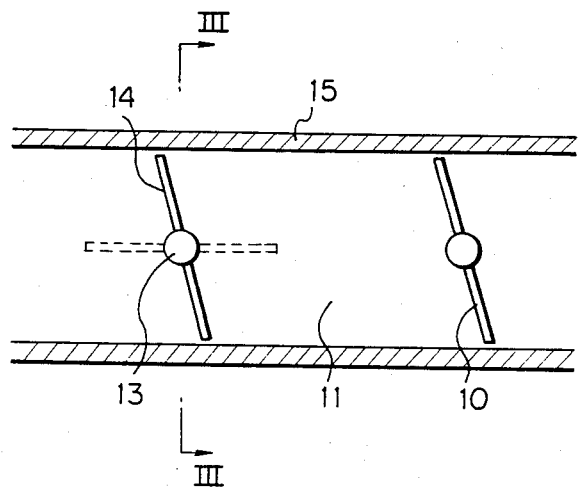
FIG. 2 is a cross-sectional side view of an intake duct.
Figure 3:
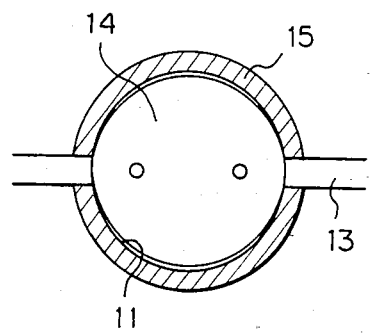
FIG. 3 is a cross-sectional view of the intake duct, taken along the line III—III in FIG. 2.

Referring to FIG. 1, reference numeral 1 designates an engine, 2 a piston, 3 a spark plug, and 4 an intake valve; 5 designates a fuel injector, 6 a surge tank, 7 an air flow meter, and 8 an air cleaner. A throttle valve 10 is arranged in an intake passage 11 located between the surge tank 6 and the air flow meter 7. This throttle valve 10 is connected to an accelerator pedal 9 which is operated by a vehicle driver. In addition, a flow control valve 14 is arranged in the intake passage 11 between the throttle valve 10 and the surge tank 6. As illustrated in FIGS. 1 through 3, the flow control valve 14 is a butterfly valve, and thus has a shape which is almost the same as that of the throttle valve 10. The flow control valve 14 has a valve shaft 13 rotatably supported by an intake duct 15 and is rotatable between the closed position (solid line in FIG. 2) and the fully open position (broken line in FIG. 2). The open area of the flow control valve 14 in the closed position is approximately equal to the open area of the throttle valve 10 in the idling position. As illustrated in FIG. 1, the valve shaft 13 of the flow control valve 14 is connected to a DC motor 12. In addition, an accelerator switch 16 is provided and connected to the accelerator pedal 9. This accelerator switch 16 is turned ON when the accelerator pedal 9 is depressed. The DC motor 12 and the accelerator switch 16 are connected to an electronic control unit 30. In the embodiment illustrated in FIG. 1, the flow control valve 14 is arranged in the intake passage 11 downstream of the throttle valve 10. However, the flow control valve 14 may be arranged in the intake passage 11 upstream of the throttle valve 10, according to individual requirements.

In FIG. 1, reference numerals 20 and 21 designate a pair of driven wheels, and reference numerals 22 and 23 designate a pair of free running wheels. The output power of the engine 1 is transfered to the driven wheels 20 and 21 via a transmission 25 and a propeller shaft 26. A pair of first speed sensors 27 and 28 for detecting the speed of rotation of the free running wheels 22 and 23 are provided at the free running wheels 22 and 23, respectively. The first speed sensors 27 and 28 produce an output pulse at each rotation of the free running wheels 22 and 23 by a predetermined angle, respectively. The first speed sensors 27 and 28 are connected to the electronic control unit 30, and the speed of rotation of each of the free running wheels 22 and 23 is calculated in the electronic control unit 30. In addition, a second speed sensor for detecting the speed of rotation of the propeller shaft 26, that is, for detecting the average speed of rotation of the driven wheels 20 and 21, is mounted on the transmission 25. This second speed sensor 29 produces output pulses having a frequency which is proportional to the average speed of rotation of the driven wheels 20 and 21. The second speed sensor 29 is connected to the electronic control unit 30, and the average speed of rotation of the driven wheels 20 and 21 is calculated in the electronic control unit 30.

Figure 4:
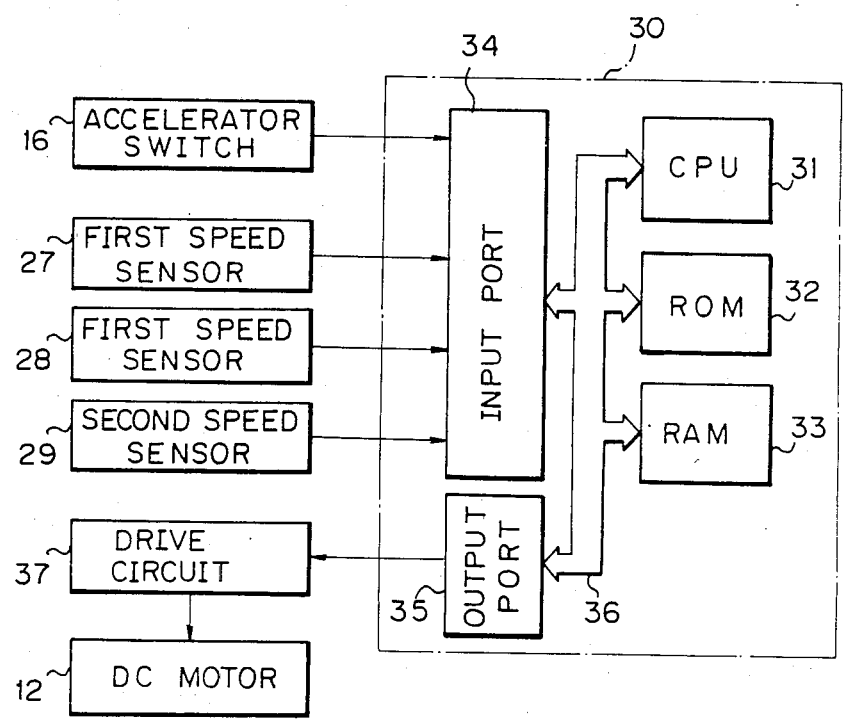
FIG. 4 is a circuit diagram of an electronic control unit.

FIG. 4 illustrates the electronic control unit 30. The electronic control unit 30 is, for example, constructed as a digital computer and comprises a central processing unit 31 (CPU), e.g., a micro-processor, a read-only memory (ROM) 32, a random-access memory (RAM) 33, an input port 34, and an output port 35. The CPU 31, the ROM 32, the RAM 33, the input port 34, and the output port 35 are interconnected via a bidirectional bus 36. The accelerator switch 16, the first speed sensors 27, 28, and the second speed sensor 29 are connected to the input port 34, and the output port 35 is connected to the DC motor 12 via a drive circuit 37.

Figure 5:
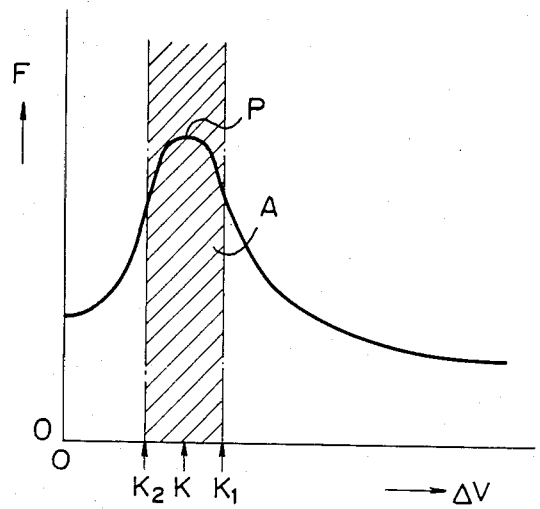
FIG. 5 is a diagram illustrating the relationship between the frictional force and the speed of rotation of the driven and free-running wheels.

FIG. 5 illustrates the frictional force between the tires of the driven and free wheels and the surface of the ground. In FIG. 5, the ordinate F indicates the frictional force between the tires of the driven and free wheels and the surface of the ground, and the abscissa $\Delta V$ indicates the speed difference obtained by subtracting the speed of rotation of the free running wheel from the speed of rotation of the driven wheel, as explained later in detail in FIG. 7. This free running wheel speed of rotation represents the actual speed of the motor vehicle, and the driven wheel speed of rotation represents the apparent vehicle speed calculated by the speed of rotation of the driven wheel. As illustrated in FIG. 5, the frictional force F increases as the speed difference $\Delta V$ increases and, when the speed difference $\Delta V$ is equal to K, the frictional force F is at its maximum P.

The frictional force F then decreases as the speed difference $\Delta V$ is increased. Consequently, it can be understood that, when the speed of rotation of the driven wheel is higher than the speed of rotation of the free running wheel by K, that is, when slight slippage occurs at the driven wheel, the frictional speed F is at its maximum P. The driving force applied to the vehicle by the driven wheel increases as the frictional force F increases. Consequently, when the frictional force F is at its maximum P, the driving force applied to the vehicle by the driven wheel is also at its maximum. In other words, where the speed difference $\Delta V$ is equal to K, the best acceleration condition of the vehicle can be obtained.

Consequently, in the present invention, the speed of rotation of the driven wheel is controlled in such a manner that the speed difference $\Delta V$ is as close to K as possible when acceleration is carried out. In an actual control according to the present invention, the speed of rotation of the driven wheel is controlled in such a manner that the speed difference $\Delta V$ is maintained within the range between $K_2$ and $K_1$, illustrated by hatching in FIG. 5, during the acceleration. From FIG. 5, it can be understood that, if the speed difference $\Delta V$ is maintained within the range between $K_2$ and $K_1$, the frictional force F is maintained at a large value and, as a result, good acceleration can be obtained.

Figure 6:
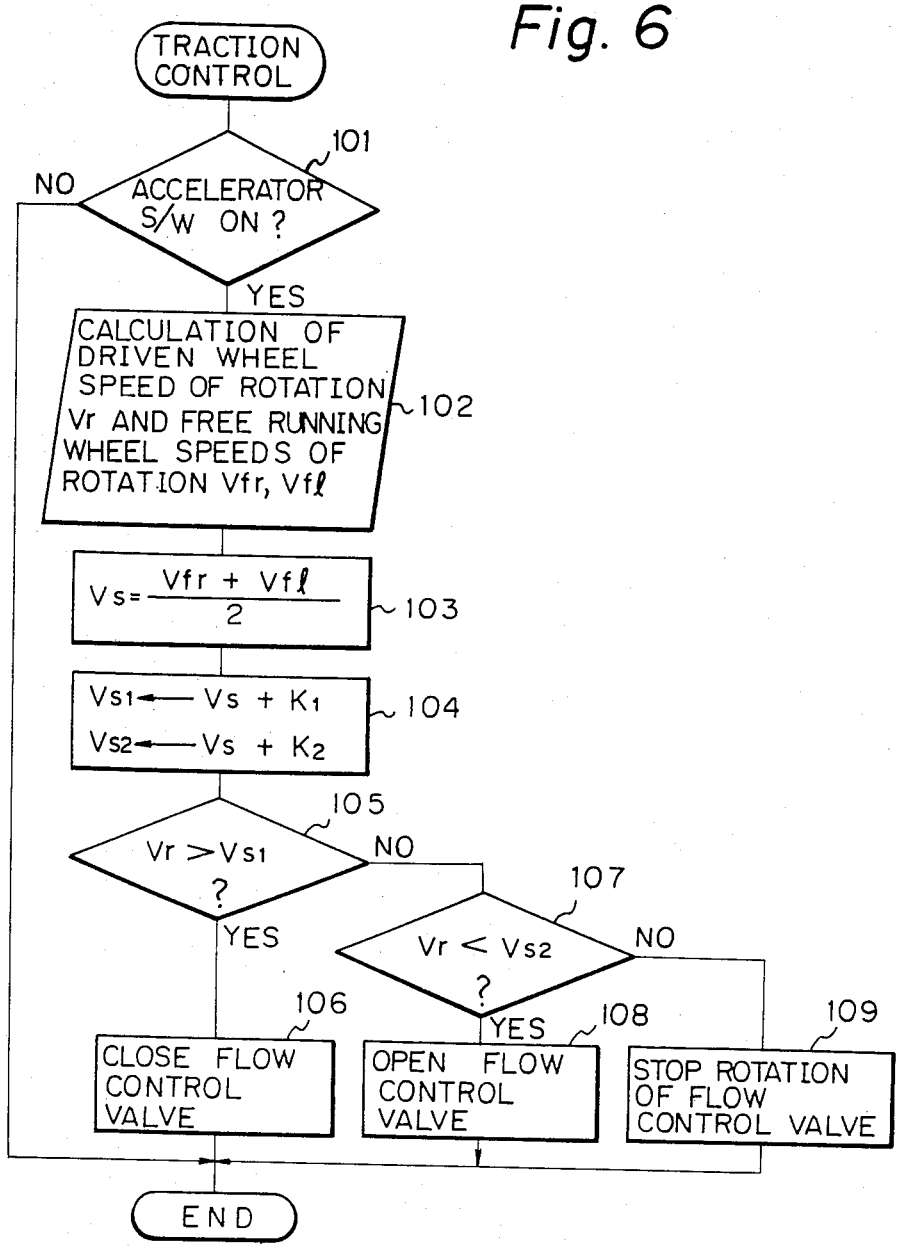
FIG. 6 is a flow chart for carrying out the traction control.

FIG. 6 is a flow chart for carrying out traction control according to the present invention. The routine illustrated in FIG. 6 is processed by sequential interruptions which are executed at each predetermined timing.

Referring to FIG. 6, initially, in step 101, it is determined from the output signal of the accelerator switch 16 whether the accelerator switch 16 is ON. If the accelerator switch 16 is OFF, that is, the throttle valve 10 is in the idling position, the processing cycle is completed. Conversely, if the accelerator switch 16 is ON, that is, the throttle valve 10 is open, it is judged that acceleration is now being carried out. At this time, the routine goes to step 102. In step 102, the output pulses of the first speed sensors 27 and 28 and the second speed sensor 29 are input to the CPU 31, and then the speed of rotation $V_r$ of the driven wheel and the speeds of rotation $V_{fr}$ and $V_{fl}$ of the free running wheels are calculated. As mentioned above, the speed of rotation $V_r$ of the driven wheel represents the average speed of rotation of the driven wheels 20 and 21. The speed of rotation $V_{fr}$ represents the speed of rotation of the free running wheel 22, and the speed of rotation $V_{fl}$ represents the speed of rotation of the free running wheel 23. The routine then goes to step 103, and the average speed of rotation $V_s$ of the free running wheels is calculated by the following equation.

$$V_s = \frac{V_{fr} + V_{fl}}{2}$$

This $V_s$ represents the actual speed of the motor vehicle. Then, in step 104, the reference speeds $V_{s1}$ and $V_{s2}$ are calculated in the following equations.

$$V_{s1} = V_s + K_1$$

$$V_{s2} = V_s + K_2$$

Where $K_1$ and $K_2$ are fixed values, and $K_1$ is larger than $K_2$. These $K_1$ and $K_2$ are illustrated in FIG. 5. In FIG.

5, if K is, for example, 5 km/hr, then $K_1$ is, for example, 7 km/hr, and $K_2$ is, for example, 3 km/hr. The routine then goes to step 105.

In step 105, it is determined whether the speed of rotation $V_r$ of the driven wheel is higher than the higher reference speed $V_{s1}$. If $V_r \degree V_{s1}$, the routine goes to step 106, and data for closing the flow control valve 14 is output to the output port 35. At this time, the DC motor 12 is driven in one direction on the basis of this data, and the flow control valve 14 is gradually closed. If $V_r \leq V_{s1}$, the routine goes to step 107, and it is determined whether the speed of rotation $V_r$ of the driven wheel is lower than the lower reference speed $V_{s2}$. If $V_r < V_{s2}$, the routine goes to step 108, and data for opening the flow control valve 14 is output to the output port 35. At this time, the DC motor 12 is driven in the reverse direction on the basis of this data, and the flow control valve 14 is gradually opened. If $V_r \leq V_{s2}$, that is, if $V_{s1} \geq V_r \geq V_{s1}$, the routine goes to step 109, and the power supply to the DC motor 12 is stopped. At this time, the flow control valve 14 is maintained in a stationary condition.

Figure 7:
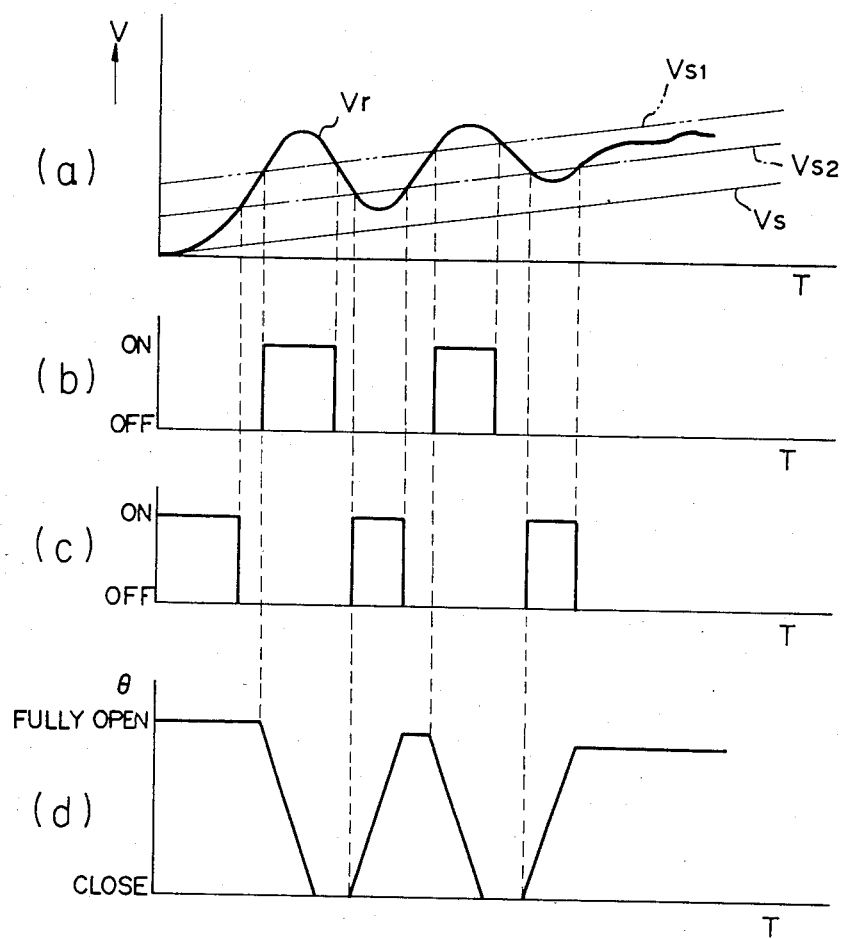
FIG. 7 is a time chart of the operation of the flow control valve and illustrating a change in the speed of rotation of the driven wheel.

FIG. 7 is a time chart of the traction control. In FIG. 7, the abscissa T indicates time. FIG. 7(a) illustrates changes in the average speed of rotation $V_s$ of the free running wheels and the speed of rotation $V_r$ of the driven wheels. When the throttle valve 10 is opened, and thus the acceleration is started, both the average speed of rotation $V_s$ of the free running wheels and the speed of rotation $V_r$ of the driven wheels increase. At this time, as illustrated in FIG. 7(a), an increase in the speed of rotation $V_r$ of the driven wheels is larger than an increase in the average speed of rotation $V_s$ of the free running wheels. At the beginning of acceleration operation, the speed of rotation $V_r$ of the driven wheel is lower than the lower reference speed $V_{s2}$. Consequently, at this time, as mentioned previously with reference to FIG. 6, the flow control valve opening signal is fed to the DC motor 12 as illustrated in FIG. 7(c) and, thereby, the DC motor 12 is rotated to open the flow control valve 14. However, at this time, in practice, the flow control valve 14 is maintained at the fully open position as illustrated in FIG. 7(d). In FIG. 7, FIG. 7(b) illustrates the condition when the flow control valve closing signal is fed to the DC motor 12; FIG. 7(c) illustrates the condition when the flow control valve opening signal is fed to the DC motor 12; and FIG. 7(d) illustrates the degree of opening $\theta$ of the flow control valve 14. When the speed of rotation $V_r$ of the driven wheels exceeds the lower reference speed $V_{s2}$, the power supply to the DC motor 12 is stopped. Consequently, at this time, the flow control valve 14 is maintained at the fully open position. Subsequently, when the speed of rotation $V_r$ of the driven wheel exceeds the higher reference speed $V_{s1}$, the flow control valve closing signal is fed to the DC motor 12 as illustrated in FIG. 7(b). At this time, the DC motor 12 is rotated in a direction which causes the flow control valve 14 to close and, as a result, the flow control valve 14 is gradually closed as illustrated in FIG. 7(d). When the flow control valve 14 is closed, the amount of air fed to the engine cylinders is reduced and thus the output power of the engine 1 is reduced. As a result, since the drive torque applied to the driven wheels 20 and 21 is reduced, the speed of rotation $V_r$ of the driven wheel is reduced as illustrated in FIG. 7(a), When the speed of rotation $V_r$ of the driven wheel is lower than the higher reference speed $V_{s1}$, the power supply to the DC motor 12 is stopped, and thus the flow control valve 14 is maintained in a stationary condition. Subsequently, if the speed of rotation $V_r$ of the driven wheel is lower than the lower reference speed $V_{s2}$, the flow control valve opening signal is fed to the DC motor 12 as illustrated in FIG. 7(b), and thus the flow control valve 14 is gradually opened. When the flow control valve 14 is opened, since the amount of air fed to the engine cylinders increases, the output power of the engine 1 increases. As a result, the speed of rotation $V_r$ of the driven vehicle again increases. As illustrated in FIG. 7(a), when acceleration is carried out, the speed of rotation $V_r$ of the driven wheel gradually increases in accordance with an increase in the average speed of rotation $V_s$ of the free running wheel. This speed of rotation $V_r$ of the driven wheel is repeatedly increased and decreased until, finally, the speed of rotation $V_r$ of the driven wheel is maintained within a range between the higher reference speed $V_{s1}$ and the lower reference speed $V_{s2}$. Consequently, during the time acceleration is carried out, the frictional force F between the driven wheels 20, 21 and the surface of the ground is maintained at an approximate maximum, and thus good acceleration can be obtained.

Figure 8:
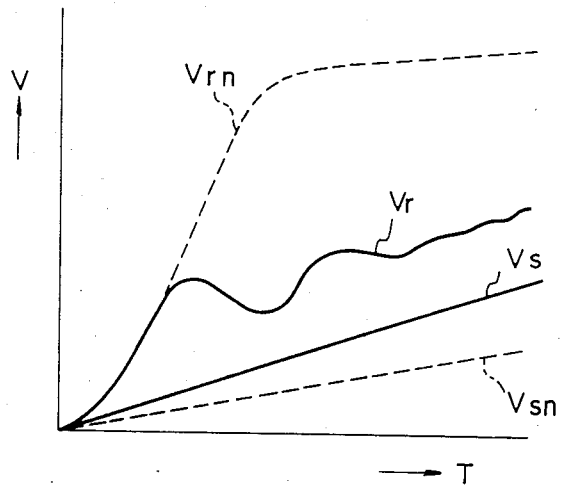
FIG. 8 is a diagram illustrating the relationship between the speed of rotation of a free running wheel and the speed of rotation of the driven wheel.

FIG. 8 illustrates the speed of rotation of the wheels in the present invention and the speed of rotation of the driven wheels in a conventional engine in which no traction control is carried out. In FIG. 8, the ordinate V indicates the speed of rotation of the wheels, and the abscissa T indicates time. In a conventional engine in which no traction control is carried out, when the accelerator pedal is abruptly depressed, the driven wheels cannot obtain a grip on the surface of the ground and violent slippage occurs, and thus the speed of rotation of the driven wheel abruptly increases, as illustrated by the broken line $V_{rn}$ in FIG. 8. As a result, as will be understood from FIG. 5, the frictional force F becomes extremely small. Therefore, since the force for driving the motor vehicle by the driven wheels is reduced, an increase in the speed of rotation of the free running wheels, that is, an increase in the actual speed of the of the motor vehicle, becomes small, as illustrated by the broken line $V_{sn}$ in FIG. 8. Contrary to this, in the present invention, since the speed of rotation of the driven wheel is controlled so that the frictional force F is maintained at an approximate maximum, as illustrated by the solid line $V_r$ in FIG. 8, the force for driving the motor vehicle by the driven wheels becomes large. As a result, an increase in the speed of rotation of the free running wheels becomes large, as illustrated by the solid line $V_s$ in FIG. 8, and thus it is possible to obtain a good acceleration of the motor vehicle.

In the embodiment illustrated in FIG. 1, the DC motor 12 is controlled by the electronic control unit 30 which is comprises as a digital computer. However, the DC motor 12 may be controlled by an electronic control unit 30 without using a microprocessor, as illustrated in FIG. 9.

Figure 9:
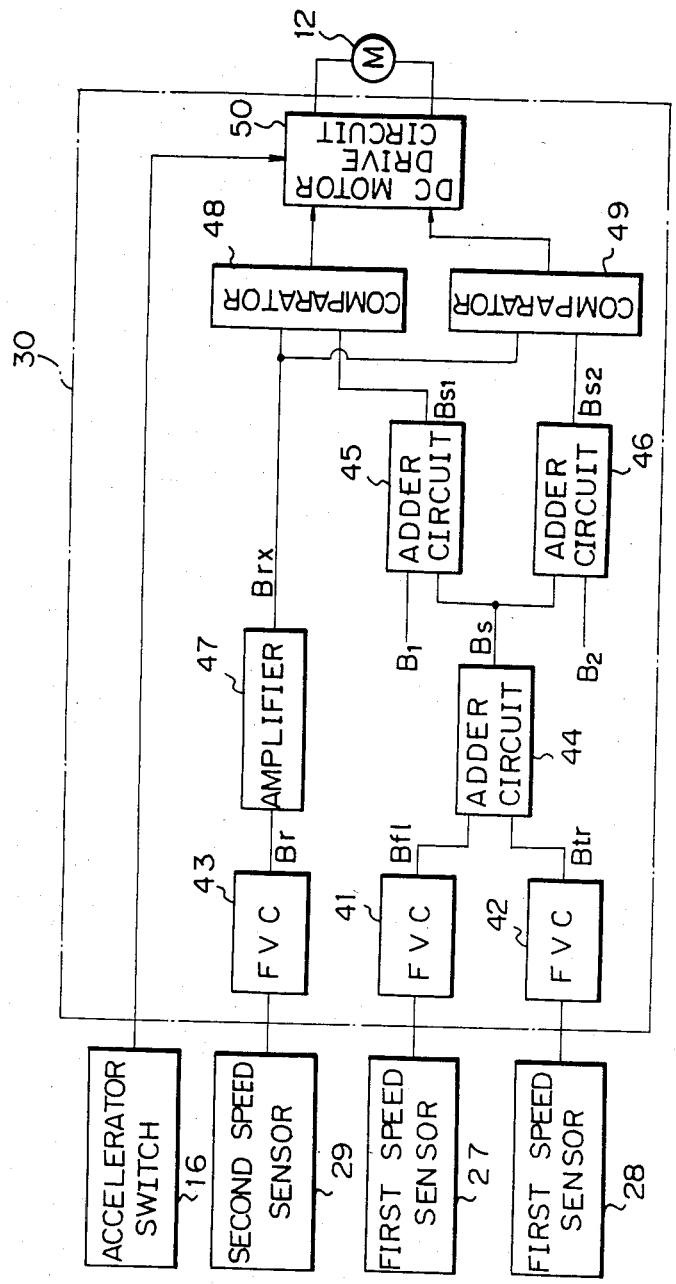
FIG. 9 is a circuit diagram of another embodiment of the electronic control unit.

Referring to FIG. 9, the electronic control unit 30 comprises three frequency-voltage converters (FVC) 41, 42, 43, three adder circuits 44, 45, 46, an amplifier 47, two comparators 48, 49, and a DC motor drive circuit 50. The first speed sensor 27 is connected to one of the input terminals of the adder circuit 44 via the FVC 41, and the first speed sensor 28 is connected to the other input terminal of the adder circuit 44 via the FVC 42. The output terminal of the adder circuit 44 is connected, on one hand, to one of the input terminals of the adder circuit 45 and, on the other hand, to one of the input terminals of the adder circuit 46. The reference voltage $B_1$ is applied to the other input terminal of the adder circuit 45, and the reference voltage $B_2$ is applied to the other input terminal of the adder circuit 46. The output terminal of the adder circuit 45 is connected to one of the input terminals of the comparator 48, and the output terminal of the adder circuit 46 is connected to one of the input terminals of the comparator 49. The second speed sensor 29 is connected to both the other input terminals of the comparators 48, 49. The accelerator switch 16 and the output terminals of the comparators 48, 49 are connected to the DC motor drive circuit 50 used for controlling the DC motor 12.

The output pulses of the first speed sensors 27, 28 are converted to the voltages $B_{fl}$ and $B_{fr}$ proportional to the frequency of the output pulses in the corresponding FVCs 41 and 42. These voltages $B_{fl}$, $B_{fr}$ are added in the adder circuit 44 and thus the adder circuit 44 produces the output voltage $B_s$ representing the average speed of rotation $V_s$ of the free running wheels. The output pulses of the second speed sensor 29 are converted to the voltage $B_r$ proportional to the frequency of the output pulses in the FVC 43. This voltage $B_r$ is amplified by the amplifier 47, and thus the amplifier 47 produces the output voltage $B_{rx}$ representing the speed of rotation $V_r$ of the driven wheel.

In the adder circuit 45, the reference voltage $B_1$ corresponding to $K_1$ in FIG. 5 is added to the output voltage $B_s$ of the adder circuit 44, and thus the adder circuit 45 produces the output voltage $B_{s1}$ representing the higher reference speed $V_{s1}$. In the adder circuit 46, the reference voltage $B_2$ corresponding to $K_2$ in FIG. 5 is added to the output voltage $B_s$ of the adder circuit 44, and thus the adder circuit 46 produces the output voltage $B_{s2}$ representing the lower reference speed $V_{s2}$ In the comparator 48, the output voltage $B_{rx}$ of the amplifier 47 and the output voltage $B_{s1}$ of the adder circuit 45 are compared. When the output voltage $B_{rx}$ is higher than the output voltage $B_{s1}$, that is, when the speed of rotation $V_r$ of the driven wheel is higher than the higher reference speed $V_{s1}$, the output voltage of the comparator 50 goes high. At this time, the DC motor 12 is rotated in a direction which causes the flow control valve 14 (FIG. 1) to close, by the output signal of the DC motor drive circuit 50. In the comparator 49, the output voltage $B_{rx}$ of the amplifier 47 and the output voltage $B_{s2}$ of the adder circuit 46 are compared. When the output voltage $B_{rx}$ is lower than the output voltage $B_{s2}$, that is, when the speed of rotation $V_r$ of the driven wheel is lower than the lower reference speed $V_{s2}$, the output voltage of the comparator 49 goes high. At this time, the DC motor 12 is rotated in a direction which causes the flow control valve 14 (FIG. 1) to open, by the output signal of the DC motor drive circuit 50. When the accelerator switch 16 is turned OFF, that is, the throttle valve 10 (FIG. 1) is closed, the power supply to the DC motor 12 is stopped. Consequently, it is possible to control the speed of rotation $V_r$ of the driven wheel, as illustrated in FIG. 7, by using the electronic control unit 30 illustrated in FIG. 9.

In the embodiments hereinbefore described, the flow control valve 14 is controlled on the basis of the difference in the speed of rotation between the speed of rotation of the driven wheel and the speed of rotation of the free running wheel. However, the flow control valve 14 may be controlled on the basis of a change in the acceleration of the speed of rotation of the driven wheel alone. That is, where acceleration of the motor vehicle is carried out, if the slippage occurs at the driven wheel, the acceleration of the speed of rotation of the driven wheel abruptly increases. Contrary to this, when the operating state of the driven wheel is changed from a state wherein the driven wheel is slipping to a state wherein the slippage of the driven wheel is stopped, the speed of rotation of the driven wheel is abruptly decelerated. Consequently, by closing the flow control valve 14 when the acceleration of the speed of rotation of the driven wheel exceeds a fixed value and by opening the flow control valve 14 when the speed of rotation of the driven wheel is decelerated, the frictional force F is maintained at an approximate maximum and, as a result, it is possible to obtain a good acceleration of the motor vehicle.

Figure 10:
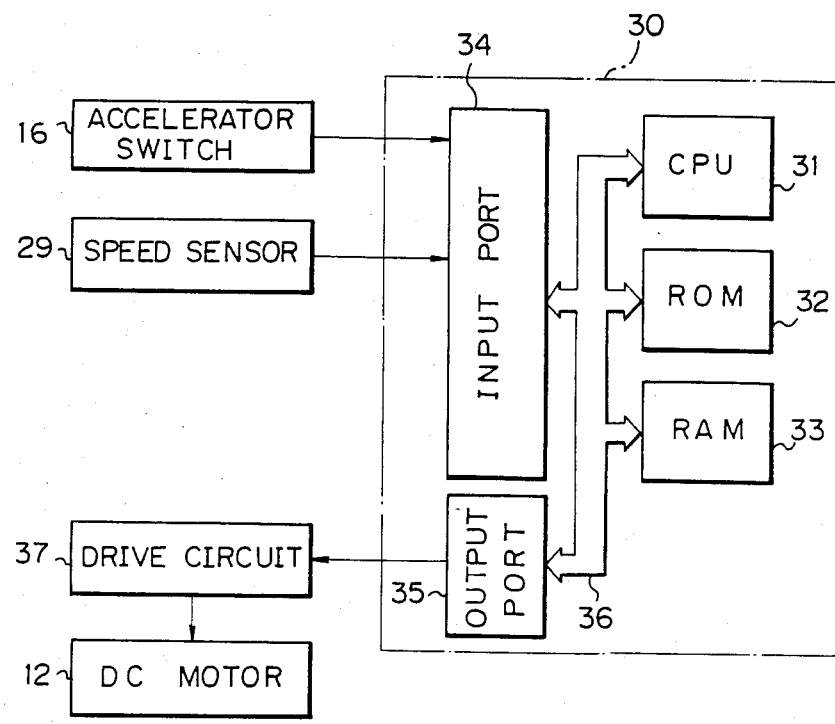
FIG. 10 is a circuit diagram of a further embodiment of the electronic control unit.

FIG. 10 illustrates an electronic control unit 30 used where the flow control valve 14 is controlled on the basis of a change in the acceleration of the speed of rotation of the driven wheel. This electronic control unit 30 has the same construction as that of the electronic control unit 30 illustrated in FIG. 4 and, therefore, a description regarding the construction of the electronic control unit 30 illustrated in FIG. 10 is omitted. However, where the flow control valve 14 is controlled on the basis of a change in the acceleration of the speed of rotation of the driven wheel, it is not necessary to detect the speed of rotation of the free running wheel. Consequently, in this case, only one speed sensor 29 is mounted on the transmission 25 (FIG. 1) for detecting the average speed of rotation of the driven wheels 20, 21 and is connected to the input port 34, as illustrated in FIG. 10.

Figure 11:
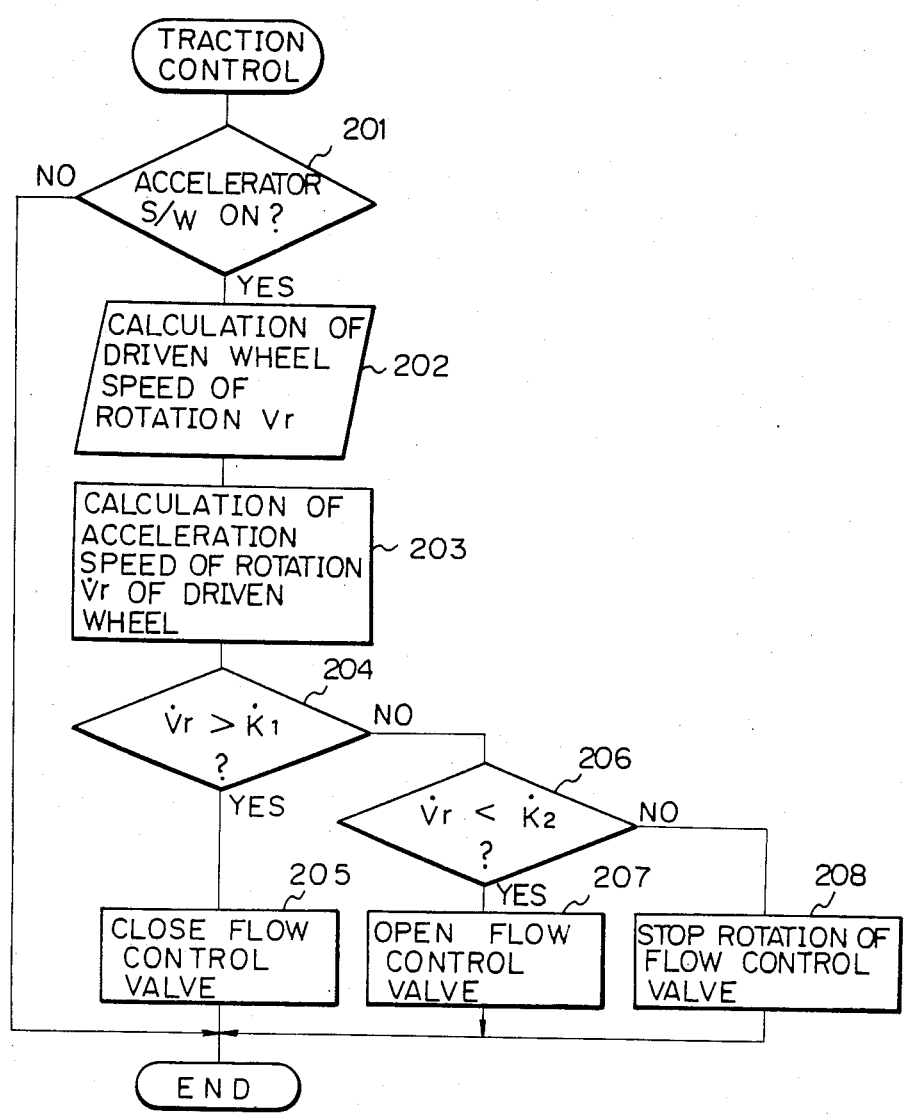
FIG. 11 is a flow chart for carrying out an alternative embodiment of the traction control.

FIG. 11 is a flow chart for carrying out the control of the flow control valve on the basis of a change in the acceleration of the speed of rotation of the driven wheel. The routine illustrated in FIG. 11 is processed by sequential interruptions which are executed at each predetermined timing.

Referring to FIG. 11, initially, in step 201, it is determined, from the output signal of the accelerator switch 16, whether the accelerator switch 16 is ON. If the accelerator switch 16 is ON, that is, the throttle valve 10 is open, the routine goes to step 202. In step 202, the output pulses of the speed sensor 29 are input to the CPU 31 and then the speed of rotation $V_r$ of the driven wheel representing the average speed of rotation of the driven wheels 20 and 21 (FIG. 1) is calculated. Then, in step 203, the acceleration of the speed of rotation $\dot{V}_r$ of the driven wheel is calculated by differentiating $V_r$, for example, by subtracting the present speed of rotation $V_r$ of the driven wheel from the speed of rotation $V_r$ of the driven wheel calculated in the preceding processing cycle and stored in the RAM 33. Then, in step 204, it is determined whether the acceleration of the speed of rotation $\dot{V}_r$ is larger than a predetermined fixed valve $\dot{K}_1$. This $\dot{K}_1$ is a positive value as later described in reference to FIG. 12(b). If $\dot{V}_r > \dot{K}_1$, the routine goes to step 205, and the flow control valve 14 (FIG. 1) is closed. If $\dot{V}_r \leq \dot{K}_1$, the routine goes to step 206, where it is determined whether $\dot{V}_r$ is smaller than $\dot{K}_2$ which is a negative value, that is, the deceleration of the speed of rotation $|\dot{V}_r|$ is larger than a predetermined fixed positive valve $|\dot{K}_2|$. If $\dot{V}_r < \dot{K}_2$, the routine goes to step 207, and the flow control valve 14 is opened. If $\dot{V}_r \geq \dot{K}_2$, that is, if $\dot{K}_1 \geq \dot{V}_r \geq \dot{K}_2$, the routine goes to step 208, and the power supply to the DC motor 12 is stopped. At this time, the flow control valve 14 is maintained in a stationary condition.

Figure 12:
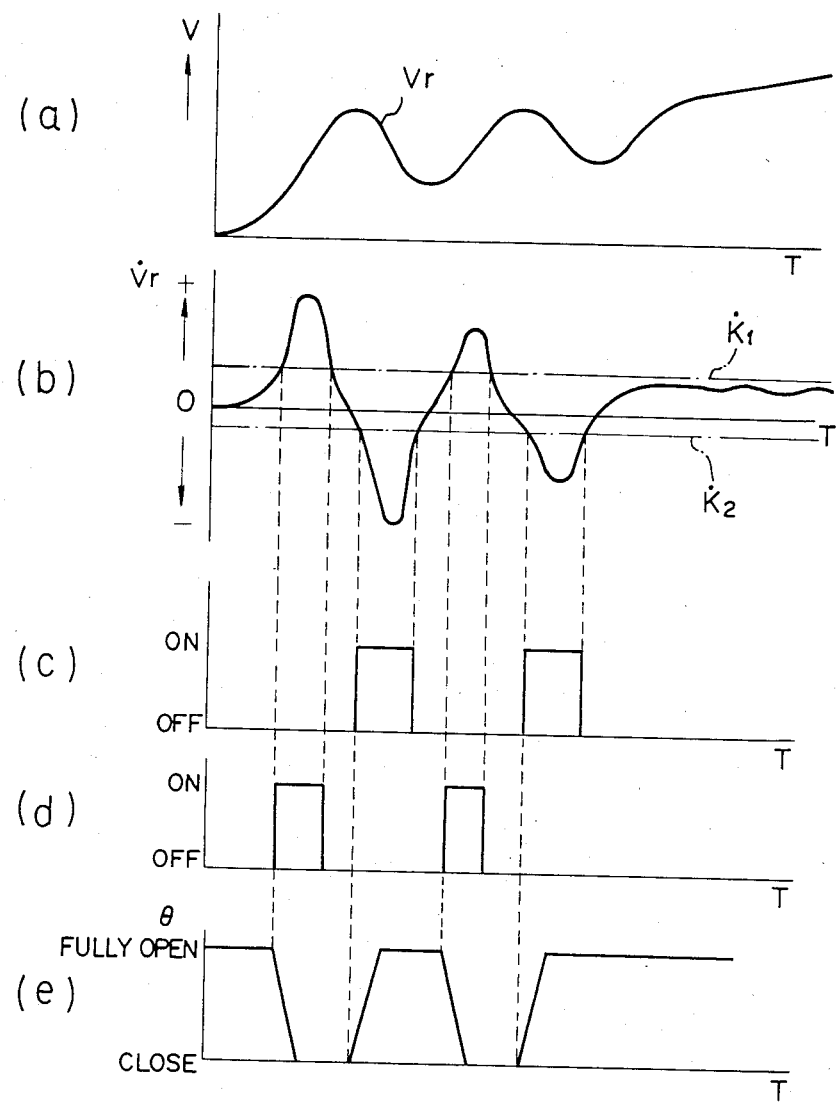
FIG. 12 is a time chart of the operation of the flow control valve and illustrating a change in the speed of rotation of the driven wheel.

FIG. 12 is a time chart of the traction control executed in accordance with the flow chart illustrated in FIG. 11. In FIG. 12, the abscissa T indicates time, and FIG. 12(a) illustrates a change in the speed of rotation $V_r$ of the driven wheel; FIG. 12(b) illustrates a change in the acceleration of the speed of rotation $\dot{V}_r$ of the driven wheel; FIG. 12(c) illustrates the flow control valve opening signal fed to the DC motor 12; FIG. 12(d) illustrates the flow control valve closing signal fed to the DC motor 12; and FIG. 12(e) illustrates the degree of opening $\theta$ of the flow control valve 14. In the ordinate of FIG. 12, plus indicates acceleration, and minus indicates deceleration.

When the acceleration of the motor vehicle is carried out, if slippage of the driven wheel occurs relative to the surface of the ground, the speed of rotation of the driven wheel abruptly increases. As a result, the acceleration of the speed of rotation $\dot{V}_r$ increases. If the acceleration of the speed of rotation $\dot{V}_r$ exceeds the fixed valve $\dot{K}_1$ as illustrated in FIG. 12(b), the flow control valve closing signal is fed to the DC motor 12 as illustrated in FIG. 12(d), and thus the flow control valve 14 is gradually closed as illustrated in FIG. 12(e). If the flow control valve 14 is closed, the drive torque applied to the driven wheels 20, 21 is reduced and the operating state of the driven wheels 20, 21 is changed from a state wherein the driven wheels 20, 21 are slipping to a state wherein the slippage of the driven wheels 20, 21 is stopped. That is, the speed of rotation of the driven wheels 20, 21 is reduced. Consequently, at this time, the speed of rotation $V_r$ is decelerated. If the deceleration of the speed of rotation $|\dot{V}_r|$ becomes larger than $|\dot{K}_2|$, as illustrated in FIG. 12(b), the flow control valve opening signal is fed to the DC motor 12 as illustrated in FIG. 12(c), and thus the flow control valve 14 is gradually opened as illustrated in FIG. 12(e). If the flow control valve 14 is opened, the output power of the engine 1 increases and the speed of rotation $V_r$ of the driven wheel again increases. Consequently, as illustrated in FIG. 12(a), when the acceleration is carried out, the speed of rotation $V_r$ of the driven wheel gradually increases. This speed of rotation $V_r$ is repeatedly increased and decreased until, finally, the acceleration of the speed of rotation $\dot{V}_r$ is maintained within a range between $\dot{K}_1$ and $\dot{K}_2$, as illustrated in FIG. 12(b). At this time, the frictional force F between the driven wheels 20, 21 and the surface of the ground is maintained at an approximate maximum and thus a good acceleration can be obtained. This embodiment has an advantage in that the speed sensor for detecting the speed of rotation of the free running wheels becomes unnecessary.

In the embodiment illustrated in FIGS. 10 through 12, the DC motor 12 is controlled by the electronic control unit 30 which is comprises a digital computer. However, the DC motor 12 may be controlled by an electronic control unit 30 without using a microprocessor, as illustrated in FIG. 13.

Figure 13:
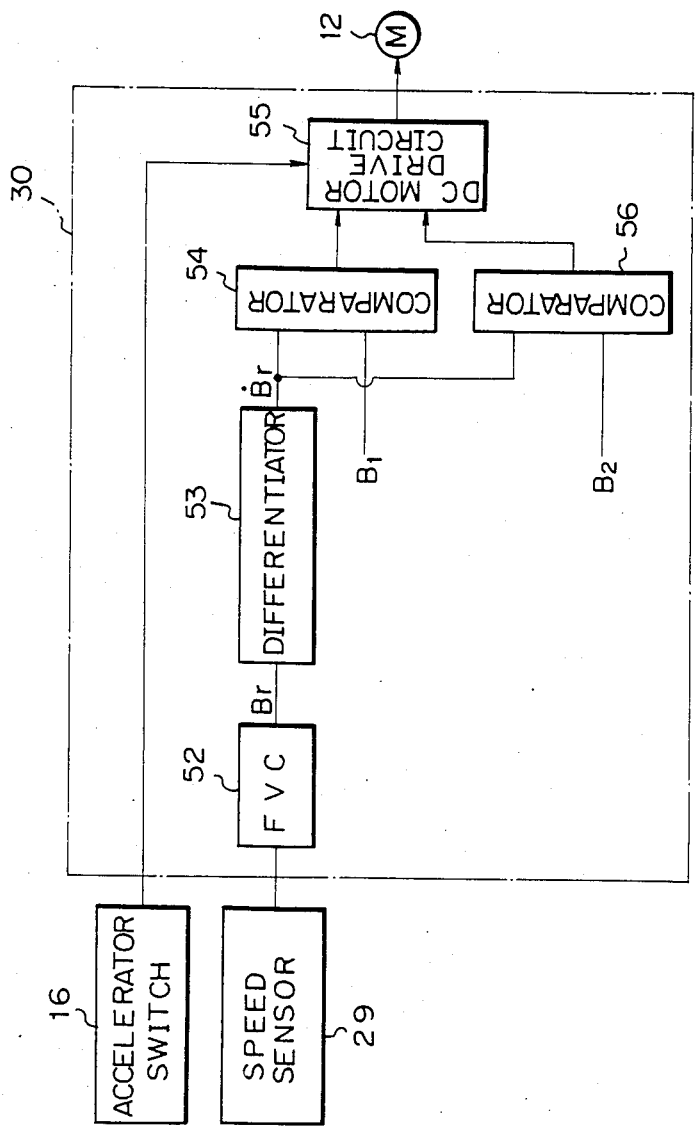
FIG. 13 is a circuit diagram of a still further embodiment of the electronic control unit.

Referring to FIG. 13, the electronic control unit 30 comprises an FVC 52, a differentiator 53, two comparators 54, 56, and a DC motor drive circuit 55. The speed sensor 29 for detecting the average speed of rotation of the driven wheels 20, 21 is connected to the input terminal of the differentiator 53 via the FVC 52. The output terminal of the differentiator 53 is connected, on one hand, to one of the input terminals of the comparator 54 and, on the other hand, to one of the input terminals of the comparator 56. The reference voltage $B_1$ is applied to the other input terminal of the comparator 54, and the reference voltage $B_2$ is applied to the other input terminal of the comparator 56. The accelerator switch 16 and the output terminals of the comparators 54, 56 are connected to the DC motor drive circuit 55 used for controlling the DC motor 12.

The output pulses of the speed sensor 29 are converted to the voltage $B_r$ proportional to the frequency of the output pulses in the FVC 52. This voltage $B_r$ represents the speed of rotation $V_r$ of the driven wheel. The voltage $B_r$ is differentiated in the differentiator 53, and thus the differentiator 53 produces an output voltage representing the acceleration of the speed of rotation $\dot{V}_r$ of the driven wheels. In the comparator 54, the output voltage $\dot{B}_r$ is compared with the reference voltage $B_1$ corresponding to the fixed value $\dot{K}_1$ (FIG. 12(b)). When the output voltage $\dot{B}_r$ is higher than the reference voltage $B_1$, that is, when the acceleration of the speed of rotation $\dot{V}_r$ is larger than the fixed value $\dot{K}_1$, the output voltage of the comparator 54 goes high. At this time, the DC motor 12 is rotated in a direction which causes the flow control valve 14 to close, by the output signal of the DC motor drive circuit 50. In the comparator 56, the output voltage $\dot{B}_r$ is compared with the reference voltage $B_2$ corresponding to the fixed value $\dot{K}_2$ (FIG. 12(b)). When the output voltage $\dot{B}_r$ is lower than the reference voltage $B_2$, that is, when the deceleration of rotation $|\dot{V}_r|$ is larger than the fixed value $|\dot{K}_2|$, the output voltage of the comparator 56 goes high. At this time, the DC motor 12 is rotated in a direction which causes the flow control valve 14 to open, by the output signal of the DC motor drive circuit 55. When the accelerator switch 16 is turned OFF, that is, the throttle valve 10 (FIG. 1) is closed, the power supply to the DC motor 12 is stopped. Consequently, it is possible to control the speed of rotation $V_r$ of the driven wheel, as illustrated in FIG. 12, by using the electronic control unit 30 illustrated in FIG. 13.

In the embodiments heretofore described, the DC motor 12 is used for activating the flow control valve 14. However, a motor of any other type such as a stepper motor and a linear solenoid may be used for actuating the flow control valve 14 instead of the DC motor 12.

According to the present invention, when the acceleration of the motor vehicle is carried out, the drive torque applied to the driven wheels is controlled so that the frictional force between the driven wheel and the surface of the ground is maintained at an approximate maximum. Consequently, it is possible to prevent violent slippage occurring at the driven wheels at the time of acceleration, and thus it is possible to obtain a good acceleration of the motor vehicle. In addition, in the present invention, the speed of rotation of the driven wheel is controlled by the flow control valve, which is provided separately to the throttle valve. Consequently, even if the control device for the flow control valve is damaged, the engine still can be controlled by the accelerator pedal operated by a vehicle driver and, therefore, it is possible to obtain a safe driving condition.

While the invention has been described by reference to specific embodiments chosen for purposes of illustration, it should be apparent that numerous modifications could be made thereto by those skilled in the art without departing from the basic concept and scope of the invention.

We claim:

1. A traction control device for a motor vehicle having a plurality of wheels including at least one drive wheel, and an internal combustion engine having an intake passage and connected to said driven wheel for driving said driven wheel, said device comprising:
 a manually operated throttle valve adapted to be coupled in said intake passage;
 detecting means adapted for detecting a speed of rotation of said driven wheel and providing an output signal corresponding thereto;
 a flow control valve adapted to be coupled in said intake passage in series with said manually operated throttle valve;
 drive means for driving said flow control valve; and
 electronic control means, coupled to said detecting means and said drive means, for controlling a flow area of said flow control valve in response to said output signal of said detecting means to cause the speed of rotation of said driven wheel to approach a desired speed of rotation at which a frictional force between said driven wheel and the ground reaches a maximum, when the speed of rotation of said driven wheel deviates from said desired speed of rotation during a time of acceleration of the motor vehicle.

2. A traction control device according to claim 1, wherein said motor vehicle has a free running wheel, and wherein said detecting means comprises a first speed sensor adapted for detecting the speed of rotation of said free running wheel, and a second speed sensor adapted for detecting the speed of rotation of said driven wheel, said electronic control means controlling the flow area of said flow control valve in response to output signals from said first speed sensor and said second speed sensor.

3. A traction control device according to claim 2, wherein said motor vehicle has a plurality of free running wheels and a plurality of driven wheels, said first speed sensor comprising a plurality of sensors each adapted for detecting the speed of rotation of the corresponding free running wheel for obtaining an average speed of rotation of said free wheels, said second speed sensor adapted for detecting the average speed of rotation of said driven wheels.

4. A traction control device according to claim 2, wherein said electronic control means comprises first comparing means for comparing the speed of rotation of said driven wheel with a predetermined higher reference speed and producing an output signal to cause said flow control valve to close when the speed of rotation of said driven wheel exceeds said higher reference speed, and second comparing means for comparing the speed of rotation of said driven wheel with a predetermined lower reference speed and producing an output signal to cause said flow control valve to open when the speed of rotation of said driven wheel becomes lower than said lower reference speed.

5. A traction control device according to claim 4, wherein said electronic control means produces an output signal to stop the opening and closing operation of said flow control valve when the speed of rotation of said driven wheel is within a range between said higher reference speed and said lower reference speed.

6. A traction control device according to claim 4, wherein said higher reference speed and said lower reference speed are determined on the basis of the speed of rotation of said free running wheel.

7. A traction control device according to claim 6, wherein said higher reference speed is determined by adding a fixed speed to the speed of rotation of said free running wheel, and said lower reference speed is determined by adding another separate fixed speed to the speed of rotation of said free running wheel.

8. A traction control device according to claim 2, wherein said electronic control means comprises an FVC converting an output signal of said first speed sensor to a voltage signal representing the speed of rotation of said free running wheel, and an FVC converting an output signal of said second speed sensor to a voltage signal representing the speed of rotation of said driven wheel.

9. A traction control device according to claim 1, wherein said detecting means comprises a speed sensor adapted for detecting the speed of rotation of said driven wheel, said electronic control means controlling the flow area of said flow control valve in response to an output signal of said speed sensor.

10. A traction control device according to claim 9, wherein said motor vehicle has a plurality of driven wheels, said speed sensor detecting an average speed of rotation of said driven wheels.

11. A traction control device according to claim 9, wherein said electronic control means comprises differentiating means differentiating the speed of rotation of said driven wheel and producing an output signal representing acceleration and deceleration of said driven wheel, first comparing means for comparing said acceleration with a predetermined reference acceleration and producing an output signal to cause said flow control valve to close when said acceleration exceeds said predetermined reference acceleration, and second comparing means for comparing said deceleration with a predetermined reference deceleration and producing an output signal to cause said flow control valve to open when said deceleration exceeds said reference deceleration.

12. A traction control device according to claim 11, wherein said electronic control means produces an output signal to stop the opening and closing operation of said flow control valve when said acceleration is smaller than said reference acceleration and when said deceleration is smaller than said reference deceleration.

13. A traction control device according to claim 11, wherein said reference acceleration and said reference deceleration are fixed values, and said reference acceleration is larger than said reference deceleration.

14. A traction control device according to claim 13, wherein said reference acceleration is a positive value, and said reference deceleration is a positive value.

15. A traction control device according to claim 9, wherein said electronic control means comprises an FVC converting an output signal of said speed sensor to a voltage signal representing the speed of rotation of said driven wheel.

16. A traction control device according to claim 1, further comprising an accelerator switch which produces an output signal indicating when said throttle valve is open, said electronic control means controlling the flow area of said flow control valve in response to the output signal of said accelerator switch to cause the speed of rotation of said driven wheel to approach said desired speed of rotation only when said throttle valve is open.

17. A traction control device according to claim 1, wherein said flow control valve is shaped in the form of a butterfly valve which is rotatable around a valve shaft.

18. A traction control device according to claim 17, wherein said flow control valve is rotatable between a closed position and a fully open position, and the flow area of said flow control valve in said closed position is approximately equal to the flow area of said throttle valve in an idling position.

19. A traction control device according to claim 1, wherein said drive means comprises an electrical motor.

20. A traction control device according to claim 1 wherein said throttle valve and said control valve have substantially the same shape.

* * * * *